June 17, 1969 J. F. WHY 3,450,846
TELEPHONE TONE RINGER
Filed July 18, 1966
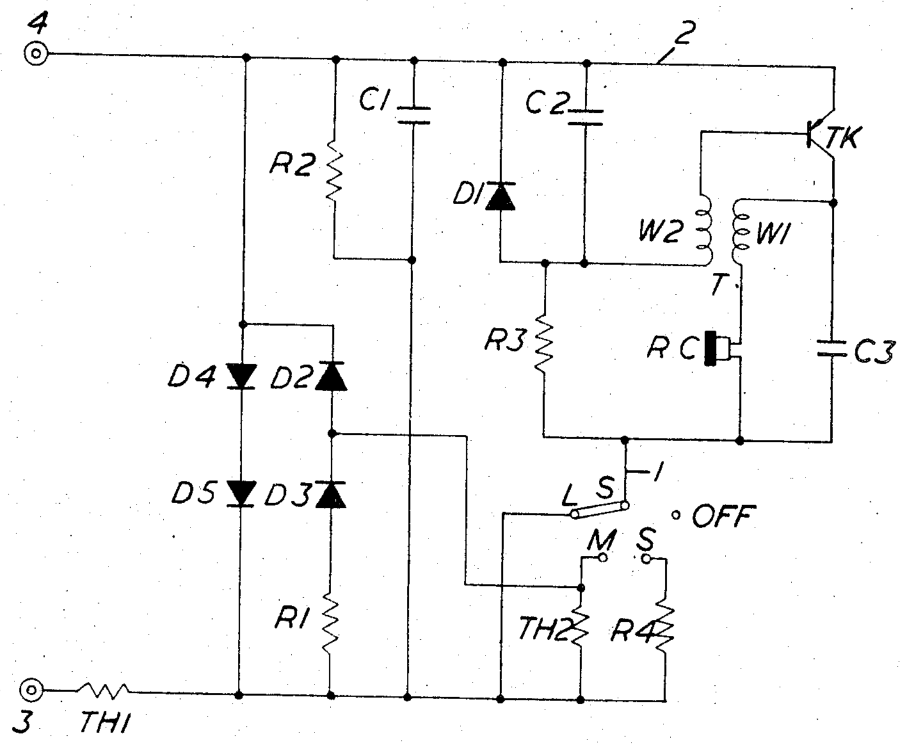

United States Patent Office 3,450,846

Patented June 17, 1969

3,450,846

TELEPHONE TONE RINGER

John Frederick Why, Dunstable, England, assignor to International Standard Electric Corporation, New York, N.Y., a corporation of Delaware Filed July 18, 1966, Ser. No. 566,135

Int. Cl. H04m 3/02

U.S. Cl. 179—84 8 Claims

ABSTRACT OF THE DISCLOSURE

A telephone tone ringer circuit using a thermally sensitive component to delay the application of the full volume of the audible signal.

The present invention relates to a telephone tone ringer, and more particularly a tone ringer of the type in which the conventional low frequency ringing currents are used to energise an oscillator circuit to generate a higher frequency tone signal which is applied to an electro-acoustic transducer to attract the attention of a called telephone subscriber in a more pleasant manner than, for example, by a conventional magnetobell operated directly by said ringing currents.

In some circumstances, the full volume of the audible calling signal may be rather greater than necessary to attract the attention of the subscriber, who may be in close proximity to his set or extension set, and at the same time sufficiently great to be a nuisance to other persons, who for one reason or another do not intend to engage in a telephone conversation using the set to which a ringing signal is being applied. One example of such circumstances is a large office, in which a number of clerical employees are accommodated and each has an individual extension set on a desk at which he is normally seated; another example is a private residence, in which the set is usually located in or near one of the reception rooms and in which one or more members of the household may be sleeping in a bedroom. In such circumstances, the purpose of the calling signal may be adequately served with the minimum of nuisance to persons other than the one who is to answer the call, by a calling signal which is arranged to build up in volume from an initially low value to its full volume over a period of the order of 10 to 30 seconds.

U.S. Patent No. 3,387,097 there is described a telephone tone ringer comprising a transistor oscillator circuit adapted to be energised by energy derived from low frequency ringing currents applied in bursts of current at a predetermined cadence, and comprising circuit means for applying said energy to said oscillator circuit at a rate increasing during the initial bursts of said ringing currents, wherein said circuit means comprises a thermally sensitive resistor connected in series with said oscillator circuit, and wherein said thermally sensitive resistor has a negative temperature coefficient of resistance and a heating time constant greater than twice the period of said cadence.

If it is desired to operate a number of tone ringers in series, for example, where they are associated with telephone extension circuits, then each tone ringer will have to operate on low voltage. The present invention relates to modifications and improvements in the tone ringer described in the above-mentioned patent which will enable it to operate more efficiently on low voltage.

In the tone generator described in the above-mentioned patent a rectifying diode is connected in parallel with the oscillator circuit and the thermally sensitive resistor. This acts as a shunt rectifier to suppress those half-waves of the ringing current which would be of the wrong polarity for normal forward operation of the transistor of the oscillator circuit, and so this current does not pass through the thermally sensitive resistor during the one half cycle of the ringing currents. Thus, to obtain acoustic build-up using a low working voltage would require, in this arrangement, a thermally sensitive resistor capable of operating on very low power input.

In order not to waste the current available during one half-cycle of the supply voltage and to increase the power available to the thermally sensitive resistor, there is provided, according to one feature of the present invention, a telephone tone ringer according to the above-mentioned patent, and in which a rectifying diode is connected in parallel with the oscillator circuit and in series with the thermally sensitive resistor, so that said rectifying diode shunts the oscillator circuit during those half-cycles of the ringing current which are of the wrong polarity for operation of the oscillator circuit but enables current to pass through the thermally sensitive resistor during said half-cycles.

According to a further feature of the present invention a resistor and a rectifying diode in series are connected in parallel with the thermally sensitive resistor so that current passes through the resistor only during the half-cycles of the ringing current which are of the wrong polarity for operation of the oscillator circuit. Thus according to this further feature of the present invention the value of this resistor can be adjusted to adjust the rate of acoustic build-up.

In the tone ringer as described in the abovementioned patent, the transistor oscillator circuit is a two pole circuit including a single transistor and a transformer. The collector electrode of this transistor is connected via a first winding of the transformer to the first of the two poles, the base electrode of the transistor is connected via a second winding of the transformer to the first of the two poles, and the emitter electrode of the transistor is connected to the second of the two poles. The sense of the first and second windings of the transformer is such as to provide regenerative coupling at the tone frequency between the base electrode and the collector electrode of the transistor. Furthermore, the second winding of the transformer is connected to the first pole of the oscillator circuit via a biassing resistor and to the second pole of the oscillator circuit via a coupling capacitor, the reactance of the coupling capacitor at the low frequency of the ringing current being numerically smaller than the resistance of the biassing resistor.

In order to increase the base drive to the transistor and improve the sound output of the ringer under low voltage working conditions, there is provided, according to another feature of the present invention, a telephone tone ringer as described in the abovementioned patent, in which the transistor oscillator circuit is a two pole circuit including a single transistor and a transformer, in which the collector electrode is connected via a first winding of the transformer to the first of the two poles, in which the base electrode of the transistor is connected via a second winding of the transformer to the first of the two poles, in which the emitter electrode of the transistor is connected to the second of the two poles, the sense of the first and second windings being such as to provide regenerative coupling at the tone frequency between the base electrode and the collector electrode, in which the second winding is connected to the first pole via a biassing resistor and to the second pole via a coupling capacitor and a rectifying diode connected in parallel, the rectifying diode conducting in its preferred direction when the transformer feedback is driving current into the base of the transistor, and in which the combined impedance of the coupling capacitor and the rectifying diode at the low frequency is numerically smaller than the resistance of the biassing resistor. The rectifying diode thus acts as a low impedance anchor to the second pole for one end of the feedback transformer.

A telephone tone ringer according to the present invention will now be described by way of example, with reference to the accompanying drawing, which shows a circuit diagram of the telephone tone ringer.

This telephone tone ringer includes a tone generator including a transistor oscillator circuit and an electro-acoustic transducer, circuit means for varying the rate at which energy is applied to the oscillator circuit during the first few bursts of low frequency ringing current and further circuit means for receiving these ringing currents and deriving or modifying their energy in a manner in accordance with the desired performance of the tone ringer.

In the accompanying drawing, the points in the circuit diagram indicated by the reference numerals 1 and 2 represent the two poles of the tone generator arrangement and the terminals marked 3 and 4 are the input terminals of the telephone tone ringer.

The telephone tone ringer may be used in place of the conventional magneto bell and replace the bell sound by a tone having a fundamental frequency in the range of 1200 to 2400 cycles per second, the tone being modulated or warbled at the low frequency of the ringing currents, which is usually 16⅔ cycles per second but may be as high as 50 cycles per second. The warbled tone is also interrupted at the usual ringing cadence, which in the United Kingdom, for example, consists of "on"-periods of 0.4 second each, separated by "off"-periods which are alternately 0.2 second and 2 seconds in duration.

The tone generator includes an electro-acoustic transducer RC, which in the preferred embodiment is of the rocking armature type. The transducer is preferably constructed to have a relatively small degree of acoustic damping and to be resonant at or near the frequency of the tone signals generated by the transistor oscillator. In the preferred embodiment, the tone frequency is approximately 1700 cycles per second. To enhance the acoustic output of the transducer, it may be provided with a short tuned horn at its frontal aperture.

The oscillator circuit includes a transistor TK, a transformer T for providing regenerative coupling between the base and collector electrodes of the transistor TK, a capacitor C3 for tuning the operating frequency of the oscillator circuit, a biassing resistor R3, a capacitor C2 which serves to decouple the base electrode from voltages at the tone frequency applied via the resistor R3 and to couple the base electrode to alternating components of the voltage which may be transmitted to the point 2 by the energy input circuit, and a rectifying diode D1 which acts as a low impedance anchor to the pole 2 of the oscillator circuit (i.e. to the positive input terminal 4). The collector electrode of the transistor TK is connected to point 1 via the series combination of the transducer RC and the primary-winding W1 of the transformer T; this series combination is shunted by the tuning capacitor C3. The emitter electrode is connected to point 2. The base electrode of the transistor TK is connected via the feedback winding W2 of the transformer T to the junction of the resistor R3 and the parallel combination of the diode D1 and the capacitor C2, coupling this junction to the points 1 and 2, respectively. The rectifying diode D1 conducts when the transformer feedback is driving current into the base of the transistor; it thus increases the base drive to the transistor and improves the sound output of the tone ringer under low voltage operating conditions. The diode D1, which should have a low forward operating voltage, allows C2 to be reduced in value but some capacitance is still required to obtain operation. The combined impedance of the coupling capacitor and the rectifying diode at the low frequency is numerically smaller than the resistance of the biassing resistor R3.

The circuit means for varying the rate of energy input to the oscillator circuit has a thermally sensitive resistor TH2 or thermistor, having a negative temperature coefficient of resistance, as its principal compound and further includes a manually operable switch S which has four positions, which are hereinafter referred to as the "loud," "medium," "soft" and "off" positions.

In the "medium" position of the manual switch S, thermistor TH2 is connected in series with the oscillator circuit and in series with the diode D2, the rectifying diode D2 being connected in parallel with the oscillator circuit. The rectifying diode D3 and the resistor R1 are connected in series with the diode D2 and in parallel with the thermistor TH2. In the positive half-cycle of the ringing currents, i.e. when the voltage across the terminals 3 and 4 is of the right polarity for normal forward conduction of the transistor TK, the diodes D2 and D3 do not conduct and the resistor R1 is isolated from the thermistor TH2. The voltage drop across the thermistor TH2 determines the sound output of the device RC. As the ringing current continues the thermistor TH2 is effective to produce a voltage drop decreasing from an initially high value to a relatively low value until its resistance attains its asymptotic low value when the sound output of the device RC will reach a maximum for this setting of the switch S.

In the negative half-cycle of the ringing currents, the diodes D2 and D3 conduct in their preferred directions. The diode D2 shunts the oscillator circuit which serves to make the quality of the generated tone more pleasant subjectively and to reduce the stresses applied to the transistor TK by excessive reverse voltages. However the diode D2 allows current to pass to the thermistor TH2. Thus, since current passes to the thermistor TH2 in both half-cycles, the available power to the thermistor is increased compared with the arrangement of the tone ringer as described in the above-mentioned patent, where current only passes through the thermistor during one half-cycle of the ringing current. Also, in the negative half-cycle current passes through the resistor R1. The thermal characteristics of the thermistor TH2 are so chosen, that its resistance attains its asymptotic low value after at least three repetitions of the cadence of bursts of the low frequency ringing currents applied to the input terminals of the tone ringer. Also the ratio of the resistance R1 to the thermistor TH2 resistance can be varied to obtain a required rate of acoustic buildup.

In the "loud" position of the manual switch S, the thermistor TH2 is by-passed and the full voltage-drop of the ringing current is connected across the oscillator circuit. In the "soft" position of the manual switch S, the resistance R4 is substituted for the thermistor TH2. In both the "loud" and "soft" positions no current passes through the thermistor TH2 during the positive half-cycle of the ringing currents and so it has no build-up effect on the sound output of the tone ringer.

The purpose and function of the remaining circuit elements will now be described. The thermistor TH1 is, in effect, connected in series with the transistor oscillator circuit and is chosen to have a heating time constant shorter than the period of the cadence, thereby reducing the tendency of the oscillator circuit to respond in an erroneous manner to noise pulses.

A capacitor C1 is connected in parallel with the input to the tone ringer to improve the tone of the device. Its function is to smooth to some extent the rectified pulses of ringing current. It is able to do this since there is resistance in the line and exchange feed relays. R2 is included in parallel with the input to the tone ringer to reduce transient line noise, i.e. unwanted clicks especially undesirable on party lines. It acts as a shunt across the line and reduces the voltage transient across the oscillator. The diodes D4 and D5 form a voltage regulator.

Preferably this consists of a chain of some 16 selenium plates. A selenium plate starts to conduct at approximately 0.5 volt in its forward direction, and thus 16 plates will give a regulated voltage of approximately 8 volts.

It is to be understood that the foregoing description of specific examples of this invention is made by way of example only and is not to be considered as a limitation on its scope.

I claim:

1. A telephone tone ringer comprising a transistor oscillator circuit adapted to be energized by energy derived from a source of low frequency ringing currents applied in bursts of currents at a predetermined cadence, comprising circuit means for applying said energy to said oscillator circuit at a rate increasing during the initial burst of said ringing currents, said circuit means comprising a thermally sensitive resistor connected in series with said oscillator circuit, said thermally sensitive resistor having a negative temperature coefficient of resistance and a heating time constant greater than twice the period of said cadence, and rectifying diode means and means for coupling said rectifying diode means parallel to said transistor oscillator circuit and in a first series circuit comprising said thermally sensitive resistor whereby said rectifying diode means shunts the oscillator circuit during those half cycles of ringing current which are of the wrong polarity for operation of the oscillator circuit but enables current to pass through the thermally sensitive resistor during those half cycles.

2. A telephone tone ringer as claimed in claim 1 including resistor means, a second rectifying diode means, means for coupling said resistor means and said second rectifying diode means in a second series circuit, means for coupling said second series circuit in parallel with said thermally sensitive resistor.

3. A telephone tone ringer as claimed in claim 2 wherein said transistor oscillator circuit comprises a two pole circuit, said two pole circuit including a single transistor and a transformer, means including the first winding of said transformer for connecting the collector electrode to the first of said two poles, means including a second winding of said transformer for connecting the base electrode of said transistor to the first of said two poles, means for connecting the emitter electrode of said transistor to the second of said two poles, and said first and second windings being coupled to each other so as to provide positive feedback between the base electrode and the collector electrode.

4. The telephone tone ringer of claim 3 wherein a biasing resistor is provided for connecting the second winding to said first pole, means including a coupling capacitor for connecting said second winding to said second pole, third rectifying diode means connected in parallel to said coupling capacitor, said third rectifying diode being connected so as to conduct responsive to the positive feedback to cause current to flow into the base of the transistor, and wherein the combined impedance of said coupling capacitor and the rectifying diode at said low frequency is numerically smaller than the resistance of said biasing resistor.

5. The telephone tone ringer of claim 4 wherein capacitor means couple the collector electrode to one of said two poles.

6. The telephone tone ringer of claim 5 including electro-acoustic transducer means connected in series with the said first winding.

7. The telephone tone ringer of claim 6 wherein said electro-acoustic transducer is of the rocking armature type.

8. A telephone tone ringer as claimed in claim 7 including a manually operable switch, said switch having a loud position, a medium position, and a soft position, means for by-passing said thermally sensitive resistor responsive to the operation of said switch to said loud position, means for connecting said thermally sensitive resistor in series with said oscillator circuit responsive to the operation of said switch to said medium position, and means for substituting a fixed resistance for said thermally sensitive resistor in series with the oscillator circuit responsive to the operation of said switch to said soft position.

References Cited

UNITED STATES PATENTS 3,343,100 9/1967 Medina.

KATHLEEN H. CLAFFY, *Primary Examiner.*

D. L. RAY, *Assistant Examiner.*